US011914336B2

(12) United States Patent
Nadumane et al.

(10) Patent No.: US 11,914,336 B2
(45) Date of Patent: Feb. 27, 2024

(54) PLATFORM AGNOSTIC SYSTEMS AND METHODS FOR BUILDING MANAGEMENT SYSTEMS

(71) Applicant: Honeywell International Inc., Charlotte, NC (US)

(72) Inventors: Venugopala Kilingar Nadumane, Bangalore (IN); Prabhat Ranjan, Bangalore (IN); Arun Katoch, Charlotte, NC (US); Narayanaswamy Bandi, Bangalore (IN); Manish Gupta, Bangalore (IN); Gutha Stalin Sanghamitra, Bangalore (IN); Nithin Yadalla Ramgopal, Bangalore (IN); Barnali Chetia, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 148 days.

(21) Appl. No.: 17/345,908

(22) Filed: Jun. 11, 2021

(65) Prior Publication Data

US 2021/0389739 A1 Dec. 16, 2021

Related U.S. Application Data

(60) Provisional application No. 63/044,885, filed on Jun. 26, 2020, provisional application No. 63/039,366, filed on Jun. 15, 2020.

(51) Int. Cl.
*H04L 41/0226* (2022.01)
*G05B 15/02* (2006.01)
(Continued)

(52) U.S. Cl.
CPC .......... *G05B 15/02* (2013.01); *H04L 41/0226* (2013.01); *G05B 2219/2642* (2013.01);
(Continued)

(58) Field of Classification Search
USPC ....................................................... 700/275
See application file for complete search history.

(56) References Cited

U.S. PATENT DOCUMENTS

| 191,512 | A | 6/1877 | Bennett et al. |
| 4,009,647 | A | 3/1977 | Howorth |

(Continued)

FOREIGN PATENT DOCUMENTS

| CA | 2387100 A1 | 11/2003 |
| CA | 2538139 A1 | 3/2005 |

(Continued)

OTHER PUBLICATIONS

Krioukov, "Towards Programmable Buildings: A Study of System Design for Application Portability in Buildings" Technical Report No. UCB/EECS-2013-241, Electrical Engineering and Computer Sciences University of California at Berkeley, Dec. 20, 2013, 42 Pgs. (Year: 2013).*

(Continued)

*Primary Examiner* — Emilio J Saavedra
(74) *Attorney, Agent, or Firm* — Seager, Tufte & Wickhem, LLP

(57) ABSTRACT

Devices, methods, and systems for controlling a plurality of devices and equipment installed at a building. A system or common model of the devices and equipment at the building may be accessible by a technician during setup of a BMS for a building. The system model may enforce standardized device names and standardized point names that may be hardware agnostic for the plurality of devices and equipment installed at the building. A gateway in communication with the installed devices and equipment, along with a computing device storing the system model, may receive point information from the installed devices and equipment and convert the received point information into hardware agnostic point information. The gateway may receive hardware (Continued)

agnostic control commands from the system model and convert the hardware agnostic control commands into hardware specific control commands.

20 Claims, 6 Drawing Sheets

(51) Int. Cl.
  *H04W 88/16* (2009.01)
  *H04L 12/28* (2006.01)
(52) U.S. Cl.
  CPC .......... *G06Q 50/163* (2013.01); *H04L 12/283* (2013.01); *H04W 88/16* (2013.01)

(56) References Cited

U.S. PATENT DOCUMENTS

| | | | |
|---|---|---|---|
| 4,375,637 A | 3/1983 | Desjardins |
| 4,918,615 A | 4/1990 | Suzuki et al. |
| 4,939,922 A | 7/1990 | Smalley et al. |
| 5,566,084 A | 10/1996 | Cmar |
| 5,727,579 A | 3/1998 | Chardack |
| 5,745,126 A | 4/1998 | Jain et al. |
| 5,751,916 A | 5/1998 | Kon et al. |
| 5,777,598 A | 7/1998 | Gowda et al. |
| 5,973,662 A | 10/1999 | Singers et al. |
| 6,065,842 A | 5/2000 | Fink |
| 6,139,177 A | 10/2000 | Venkatraman et al. |
| 6,144,993 A | 11/2000 | Fukunaga et al. |
| 6,157,943 A | 12/2000 | Meyer |
| 6,229,429 B1 | 5/2001 | Horon |
| 6,238,337 B1 | 5/2001 | Kambhatla et al. |
| 6,334,211 B1 | 12/2001 | Kojima et al. |
| 6,353,853 B1 | 3/2002 | Gravlin |
| 6,369,695 B2 | 4/2002 | Horon |
| 6,375,038 B1 | 4/2002 | Daansen et al. |
| 6,429,868 B1 | 8/2002 | Dehner, Jr. et al. |
| 6,473,084 B1 | 10/2002 | Phillips et al. |
| 6,487,457 B1 | 11/2002 | Hull et al. |
| 6,580,950 B1 | 6/2003 | Johnson et al. |
| 6,598,056 B1 | 7/2003 | Hull et al. |
| 6,619,555 B2 | 9/2003 | Rosen |
| 6,704,012 B1 | 3/2004 | Lefave |
| 6,720,874 B2 | 4/2004 | Fufido et al. |
| 6,741,915 B2 | 5/2004 | Poth |
| 6,796,896 B2 | 9/2004 | Laiti |
| 6,801,199 B1 | 10/2004 | Wallman |
| 6,816,878 B1 | 11/2004 | Zimmers et al. |
| 6,876,951 B2 | 4/2005 | Skidmore et al. |
| 6,882,278 B2 | 4/2005 | Winings et al. |
| 6,904,385 B1 | 6/2005 | Budike, Jr. |
| 6,907,387 B1 | 6/2005 | Reardon |
| 6,911,177 B2 | 6/2005 | Deal |
| 6,993,403 B1 | 1/2006 | Dadebo et al. |
| 6,993,417 B2 | 1/2006 | Osann, Jr. |
| 7,023,440 B1 | 4/2006 | Havekost et al. |
| 7,031,880 B1 | 4/2006 | Seem et al. |
| 7,062,722 B1 | 6/2006 | Carlin et al. |
| 7,110,843 B2 | 9/2006 | Pagnano et al. |
| 7,139,685 B2 | 11/2006 | Bascle et al. |
| 7,164,972 B2 | 1/2007 | Imhof et al. |
| 7,183,899 B2 | 2/2007 | Behnke |
| 7,200,639 B1 | 4/2007 | Yoshida |
| 7,222,111 B1 | 5/2007 | Budike, Jr. |
| 7,222,800 B2 | 5/2007 | Wruck |
| 7,257,397 B2 | 8/2007 | Shamoon et al. |
| 7,280,030 B1 | 10/2007 | Monaco |
| 7,292,908 B2 | 11/2007 | Borne et al. |
| 7,295,116 B2 | 11/2007 | Kumar et al. |
| 7,302,313 B2 | 11/2007 | Sharp et al. |
| 7,308,323 B2 | 12/2007 | Kruk et al. |
| 7,308,388 B2 | 12/2007 | Beverina et al. |
| 7,313,447 B2 | 12/2007 | Hsiung et al. |
| 7,346,433 B2 | 3/2008 | Budike, Jr. |
| 7,356,548 B1 | 4/2008 | Culp et al. |
| 7,379,782 B1 | 5/2008 | Cocco |
| 7,383,148 B2 | 6/2008 | Ahmed |
| 7,434,742 B2 | 10/2008 | Mueller et al. |
| 7,447,333 B1 | 11/2008 | Masticola et al. |
| 7,466,224 B2 | 12/2008 | Ward et al. |
| 7,496,472 B2 | 2/2009 | Seem |
| 7,512,450 B2 | 3/2009 | Ahmed |
| 7,516,490 B2 | 4/2009 | Riordan et al. |
| 7,548,833 B2 | 6/2009 | Ahmed |
| 7,551,092 B1 | 6/2009 | Henry |
| 7,557,729 B2 | 7/2009 | Hubbard et al. |
| 7,567,844 B2 | 7/2009 | Thomas et al. |
| 7,596,473 B2 | 9/2009 | Hansen et al. |
| 7,610,910 B2 | 11/2009 | Ahmed |
| 7,626,507 B2 | 12/2009 | LaCasse |
| 7,664,574 B2 | 2/2010 | Imhof et al. |
| 7,682,464 B2 | 3/2010 | Glenn et al. |
| 7,702,421 B2 | 4/2010 | Sullivan et al. |
| 7,729,882 B2 | 6/2010 | Seem |
| 7,755,494 B2 | 7/2010 | Melker et al. |
| 7,761,310 B2 | 7/2010 | Rodgers |
| 7,774,227 B2 | 8/2010 | Srivastava |
| 7,797,188 B2 | 9/2010 | Srivastava |
| 7,819,136 B1 | 10/2010 | Eddy |
| 7,822,806 B2 | 10/2010 | Frank et al. |
| 7,856,370 B2 | 12/2010 | Katta et al. |
| 7,917,232 B2 | 3/2011 | McCoy et al. |
| 7,978,083 B2 | 7/2011 | Melker et al. |
| 7,984,384 B2 | 7/2011 | Chaudhri et al. |
| 7,986,323 B2 | 7/2011 | Kobayashi et al. |
| 8,024,666 B2 | 9/2011 | Thompson |
| 8,086,047 B2 | 12/2011 | Penke et al. |
| 8,099,178 B2 | 1/2012 | Mairs et al. |
| 8,151,280 B2 | 4/2012 | Sather et al. |
| 8,176,095 B2 | 5/2012 | Murray et al. |
| 8,218,871 B2 | 7/2012 | Angell et al. |
| 8,219,660 B2 | 7/2012 | McCoy et al. |
| 8,271,941 B2 | 9/2012 | Zhang et al. |
| 8,294,585 B2 | 10/2012 | Barnhill |
| 8,302,020 B2 | 10/2012 | Louch et al. |
| 8,320,634 B2 | 11/2012 | Deutsch |
| 8,334,422 B2 | 12/2012 | Gutsol et al. |
| 8,344,893 B1 | 1/2013 | Drammeh |
| 8,375,118 B2 | 2/2013 | Hao et al. |
| 8,476,590 B2 | 7/2013 | Stratmann et al. |
| 8,516,016 B2 | 8/2013 | Park et al. |
| 8,558,660 B2 | 10/2013 | Nix et al. |
| 8,638,674 B2 | 1/2014 | Nugent |
| 8,639,527 B2 | 1/2014 | Rensvold et al. |
| 8,698,637 B2 | 4/2014 | Raichman |
| 8,816,860 B2 | 8/2014 | Ophardt et al. |
| 8,869,027 B2 | 10/2014 | Louch et al. |
| 8,904,497 B2 | 12/2014 | Hsieh |
| 8,936,944 B2 | 1/2015 | Peltz et al. |
| 8,947,437 B2 | 2/2015 | Garr et al. |
| 8,950,019 B2 | 2/2015 | Loberger et al. |
| 9,000,926 B2 | 4/2015 | Hollock et al. |
| 9,030,325 B2 | 5/2015 | Taneff |
| 9,098,738 B2 | 8/2015 | Bilet et al. |
| 9,105,071 B2 | 8/2015 | Fletcher et al. |
| 9,175,356 B2 | 11/2015 | Peltz et al. |
| 9,197,720 B2 | 11/2015 | Fernandez-Ruiz et al. |
| 9,240,111 B2 | 1/2016 | Scott et al. |
| 9,280,884 B1 | 3/2016 | Schultz et al. |
| 9,292,972 B2 | 3/2016 | Hailemariam et al. |
| 9,320,662 B2 | 4/2016 | Hayes et al. |
| 9,370,600 B1 | 6/2016 | DuPuis et al. |
| 9,373,242 B1 | 6/2016 | Conrad et al. |
| 9,396,638 B2 | 7/2016 | Wildman et al. |
| 9,311,807 B2 | 8/2016 | Schultz et al. |
| 9,406,212 B2 | 8/2016 | De Luca et al. |
| 9,418,535 B1 | 8/2016 | Felch et al. |
| 9,418,536 B1 | 8/2016 | Felch et al. |
| 9,449,219 B2 | 9/2016 | Bilet et al. |
| 9,477,543 B2 | 10/2016 | Henley et al. |
| 9,497,832 B2 | 11/2016 | Verberkt et al. |
| 9,513,364 B2 | 12/2016 | Hall et al. |
| 9,526,380 B2 | 12/2016 | Hamilton et al. |

(56) References Cited

U.S. PATENT DOCUMENTS

| | | |
|---|---|---|
| 9,526,806 B2 | 12/2016 | Park et al. |
| 9,536,415 B2 | 1/2017 | De Luca et al. |
| 9,558,648 B2 | 1/2017 | Douglas |
| 9,591,267 B2 | 3/2017 | Lipton et al. |
| 9,613,518 B2 | 4/2017 | Dunn et al. |
| 9,618,224 B2 | 4/2017 | Emmons et al. |
| 9,640,059 B2 | 5/2017 | Hyland |
| 9,672,360 B2 | 6/2017 | Barkan |
| 9,684,502 B2 | 6/2017 | Fu et al. |
| 9,710,700 B2 | 7/2017 | Bilet et al. |
| 9,715,242 B2 | 7/2017 | Pillai et al. |
| 9,721,452 B2 | 8/2017 | Felch et al. |
| 9,729,945 B2 | 8/2017 | Schultz et al. |
| 9,784,464 B2 | 10/2017 | Yamamoto et al. |
| 9,843,743 B2 | 12/2017 | Lewis et al. |
| 9,856,634 B2 | 1/2018 | Rodenbeck et al. |
| 9,872,088 B2 | 1/2018 | Fadell et al. |
| 9,875,639 B2 | 1/2018 | Bone et al. |
| 9,911,312 B2 | 3/2018 | Wildman et al. |
| 9,940,819 B2 | 4/2018 | Ferniany |
| 9,956,306 B2 | 5/2018 | Brais et al. |
| 9,986,175 B2 | 5/2018 | Frank et al. |
| 10,087,608 B2 | 10/2018 | Dobizl et al. |
| 10,223,894 B2 | 3/2019 | Raichman |
| 10,228,837 B2 | 3/2019 | Hua et al. |
| 10,235,865 B2 | 3/2019 | Thyroff |
| 10,251,610 B2 | 4/2019 | Parthasarathy et al. |
| 10,303,843 B2 | 5/2019 | Bitran et al. |
| 10,332,382 B2 | 6/2019 | Thyroff |
| 10,514,817 B2 | 12/2019 | Hua et al. |
| 10,565,844 B2 | 2/2020 | Pourmohammad et al. |
| 10,574,558 B1 * | 2/2020 | Maloney .................. H04L 41/22 |
| 10,602,474 B2 | 3/2020 | Goldstein |
| 10,607,147 B2 | 3/2020 | Raykov et al. |
| 10,819,556 B1 * | 10/2020 | Rangasamy .......... H04L 41/026 |
| 2002/0111698 A1 | 8/2002 | Graziano et al. |
| 2002/0130868 A1 | 9/2002 | Smith |
| 2003/0028269 A1 | 2/2003 | Spriggs et al. |
| 2003/0030637 A1 | 2/2003 | Grinstein et al. |
| 2003/0046862 A1 | 3/2003 | Wolf et al. |
| 2003/0071814 A1 | 4/2003 | Jou et al. |
| 2003/0078677 A1 | 4/2003 | Hull et al. |
| 2003/0083957 A1 | 5/2003 | Olefson |
| 2003/0103075 A1 | 6/2003 | Rosselot |
| 2003/0171851 A1 | 9/2003 | Brickfield et al. |
| 2003/0214400 A1 | 11/2003 | Mizutani et al. |
| 2003/0233432 A1 | 12/2003 | Davis et al. |
| 2004/0001009 A1 | 1/2004 | Winings et al. |
| 2004/0064260 A1 | 4/2004 | Padmanabhan et al. |
| 2004/0143474 A1 | 7/2004 | Haeberle et al. |
| 2004/0153437 A1 | 8/2004 | Buchan |
| 2004/0168115 A1 | 8/2004 | Bauernschmidt et al. |
| 2004/0233192 A1 | 11/2004 | Hopper |
| 2004/0260411 A1 | 12/2004 | Cannon |
| 2005/0010460 A1 | 1/2005 | Mizoguchi et al. |
| 2005/0119767 A1 | 6/2005 | Kiwimagi et al. |
| 2005/0143863 A1 | 6/2005 | Ruane et al. |
| 2005/0267900 A1 | 12/2005 | Ahmed et al. |
| 2006/0004841 A1 | 1/2006 | Heikkonen et al. |
| 2006/0009862 A1 | 1/2006 | Imhof et al. |
| 2006/0017547 A1 | 1/2006 | Buckingham et al. |
| 2006/0020177 A1 | 1/2006 | Seo et al. |
| 2006/0028471 A1 | 2/2006 | Kincaid et al. |
| 2006/0029256 A1 | 2/2006 | Miyoshi et al. |
| 2006/0058900 A1 | 3/2006 | Johanson et al. |
| 2006/0067545 A1 | 3/2006 | Lewis et al. |
| 2006/0067546 A1 | 3/2006 | Lewis et al. |
| 2006/0077255 A1 | 4/2006 | Cheng |
| 2006/0184326 A1 | 8/2006 | McNally et al. |
| 2006/0231568 A1 | 10/2006 | Lynn et al. |
| 2006/0265664 A1 | 11/2006 | Simons et al. |
| 2006/0279630 A1 | 12/2006 | Aggarwal et al. |
| 2007/0016955 A1 | 1/2007 | Goldberg et al. |
| 2007/0055757 A1 | 3/2007 | Mairs et al. |
| 2007/0055760 A1 | 3/2007 | McCoy et al. |
| 2007/0061046 A1 | 3/2007 | Mairs et al. |
| 2007/0067062 A1 | 3/2007 | Mairs et al. |
| 2007/0088534 A1 | 4/2007 | MacArthur et al. |
| 2007/0090951 A1 | 4/2007 | Chan et al. |
| 2007/0091091 A1 | 4/2007 | Gardiner et al. |
| 2007/0101433 A1 | 5/2007 | Louch et al. |
| 2007/0114295 A1 | 5/2007 | Jenkins |
| 2007/0120652 A1 | 5/2007 | Behnke |
| 2007/0139208 A1 | 6/2007 | Kates |
| 2007/0216682 A1 | 9/2007 | Navratil et al. |
| 2007/0219645 A1 | 9/2007 | Thomas et al. |
| 2007/0239484 A1 | 10/2007 | Arond et al. |
| 2007/0268122 A1 | 11/2007 | Kow et al. |
| 2008/0001763 A1 | 1/2008 | Raja et al. |
| 2008/0027885 A1 | 1/2008 | Van Putten et al. |
| 2008/0036593 A1 | 2/2008 | Rose-Pehrsson et al. |
| 2008/0062167 A1 | 3/2008 | Boggs et al. |
| 2008/0099045 A1 | 5/2008 | Glenn et al. |
| 2008/0103798 A1 | 5/2008 | Domenikos et al. |
| 2008/0120396 A1 | 5/2008 | Jayaram et al. |
| 2008/0144885 A1 | 6/2008 | Zucherman et al. |
| 2008/0183316 A1 | 7/2008 | Clayton |
| 2008/0183424 A1 | 7/2008 | Seem |
| 2008/0194009 A1 | 8/2008 | Marentis |
| 2008/0198231 A1 | 8/2008 | Ozdemir et al. |
| 2008/0209342 A1 | 8/2008 | Taylor et al. |
| 2008/0222565 A1 | 9/2008 | Taylor et al. |
| 2008/0224862 A1 | 9/2008 | Cirker |
| 2008/0242945 A1 | 10/2008 | Gugliotti et al. |
| 2008/0250800 A1 | 10/2008 | Wetzel |
| 2008/0279420 A1 | 11/2008 | Masticola et al. |
| 2008/0280275 A1 | 11/2008 | Collopy |
| 2008/0303658 A1 | 12/2008 | Melker et al. |
| 2008/0306985 A1 | 12/2008 | Murray et al. |
| 2008/0320552 A1 | 12/2008 | Kumar et al. |
| 2009/0001181 A1 | 1/2009 | Siddaramanna et al. |
| 2009/0024944 A1 | 1/2009 | Louch et al. |
| 2009/0065596 A1 | 3/2009 | Seem et al. |
| 2009/0083120 A1 | 3/2009 | Strichman et al. |
| 2009/0096791 A1 | 4/2009 | Abshear et al. |
| 2009/0125337 A1 | 5/2009 | Abri |
| 2009/0125825 A1 | 5/2009 | Rye et al. |
| 2009/0144023 A1 | 6/2009 | Seem |
| 2009/0157744 A1 | 6/2009 | McConnell |
| 2009/0160673 A1 | 6/2009 | Cirker |
| 2009/0322782 A1 | 12/2009 | Kimchi et al. |
| 2010/0048167 A1 | 2/2010 | Chow et al. |
| 2010/0058248 A1 | 3/2010 | Park |
| 2010/0064001 A1 | 3/2010 | Daily |
| 2010/0070089 A1 | 3/2010 | Harrod et al. |
| 2010/0073162 A1 | 3/2010 | Johnson et al. |
| 2010/0123560 A1 | 5/2010 | Nix et al. |
| 2010/0134296 A1 | 6/2010 | Hwang |
| 2010/0156628 A1 | 6/2010 | Ainsbury et al. |
| 2010/0156630 A1 | 6/2010 | Ainsbury |
| 2010/0188228 A1 | 7/2010 | Hyland |
| 2010/0223198 A1 | 9/2010 | Noureldin et al. |
| 2010/0249955 A1 | 9/2010 | Sitton |
| 2010/0286937 A1 | 11/2010 | Hedley et al. |
| 2010/0318200 A1 | 12/2010 | Foslien et al. |
| 2010/0324962 A1 | 12/2010 | Nesler et al. |
| 2011/0010654 A1 | 1/2011 | Raymond et al. |
| 2011/0057799 A1 | 3/2011 | Taneff |
| 2011/0077779 A1 | 3/2011 | Fuller et al. |
| 2011/0083094 A1 | 4/2011 | Laycock et al. |
| 2011/0087988 A1 | 4/2011 | Ray et al. |
| 2011/0112854 A1 | 5/2011 | Koch et al. |
| 2011/0126111 A1 | 5/2011 | Gill et al. |
| 2011/0154426 A1 | 6/2011 | Doser et al. |
| 2011/0161124 A1 | 6/2011 | Lappinga et al. |
| 2011/0169646 A1 | 7/2011 | Raichman |
| 2011/0184563 A1 | 7/2011 | Foslien et al. |
| 2011/0202467 A1 | 8/2011 | Hilber et al. |
| 2011/0273298 A1 | 11/2011 | Snodgrass et al. |
| 2011/0291841 A1 | 12/2011 | Hollock et al. |
| 2011/0298301 A1 | 12/2011 | Wong et al. |
| 2011/0316703 A1 | 12/2011 | Butler et al. |
| 2011/0320054 A1 | 12/2011 | Brzezowski |
| 2012/0022700 A1 | 1/2012 | Drees et al. |

(56) References Cited

U.S. PATENT DOCUMENTS

| | | |
|---|---|---|
| 2012/0039503 A1 | 2/2012 | Chen et al. |
| 2012/0062382 A1 | 3/2012 | Taneff |
| 2012/0075464 A1 | 3/2012 | Derenne et al. |
| 2012/0109988 A1 | 5/2012 | Li et al. |
| 2012/0112883 A1 | 5/2012 | Wallace et al. |
| 2012/0131217 A1 | 5/2012 | Delorme et al. |
| 2012/0158185 A1 | 6/2012 | El-Mankabady et al. |
| 2012/0216243 A1 | 8/2012 | Gill et al. |
| 2012/0224057 A1 | 9/2012 | Gill et al. |
| 2012/0254475 A1 | 10/2012 | Voss et al. |
| 2012/0259466 A1 | 10/2012 | Ray et al. |
| 2012/0262472 A1 | 10/2012 | Garr et al. |
| 2012/0272146 A1 | 10/2012 | D'souza et al. |
| 2012/0291068 A1 | 11/2012 | Khushoo et al. |
| 2012/0303652 A1 | 11/2012 | Tseng |
| 2012/0310418 A1 | 12/2012 | Harrod et al. |
| 2013/0055132 A1 | 2/2013 | Foslien |
| 2013/0060794 A1 | 3/2013 | Puttabasappa et al. |
| 2013/0082842 A1 | 4/2013 | Balazs et al. |
| 2013/0086152 A1 | 4/2013 | Hersche et al. |
| 2013/0091631 A1 | 4/2013 | Hayes et al. |
| 2013/0110295 A1 | 5/2013 | Zheng et al. |
| 2013/0169681 A1 | 7/2013 | Rasane et al. |
| 2013/0184880 A1 | 7/2013 | McMahon |
| 2013/0187775 A1 | 7/2013 | Marsden et al. |
| 2013/0204570 A1 | 8/2013 | Mendelson et al. |
| 2013/0229276 A1 | 9/2013 | Hunter |
| 2013/0268293 A1 | 10/2013 | Knudson et al. |
| 2013/0289774 A1 | 10/2013 | Day et al. |
| 2014/0032157 A1 | 1/2014 | Khiani |
| 2014/0040998 A1 | 2/2014 | Hsieh |
| 2014/0046490 A1 | 2/2014 | Foslien et al. |
| 2014/0046722 A1 | 2/2014 | Rosenbloom et al. |
| 2014/0058539 A1 | 2/2014 | Park |
| 2014/0167917 A2 | 6/2014 | Wallace et al. |
| 2014/0207291 A1 | 7/2014 | Golden et al. |
| 2014/0292518 A1 | 10/2014 | Wildman et al. |
| 2014/0307076 A1 | 10/2014 | Deutsch |
| 2014/0309757 A1 | 10/2014 | Le Sant et al. |
| 2014/0316582 A1 | 10/2014 | Berg-Sonne et al. |
| 2014/0320289 A1 | 10/2014 | Raichman |
| 2014/0342724 A1 | 11/2014 | Hill et al. |
| 2015/0025329 A1 | 1/2015 | Amarasingham et al. |
| 2015/0032264 A1 | 1/2015 | Emmons et al. |
| 2015/0056909 A1 | 2/2015 | Chien |
| 2015/0070174 A1 | 3/2015 | Douglas |
| 2015/0077258 A1 | 3/2015 | Nelson et al. |
| 2015/0113462 A1 | 4/2015 | Chen et al. |
| 2015/0153918 A1 | 6/2015 | Chen et al. |
| 2015/0161874 A1 | 6/2015 | Thyroff et al. |
| 2015/0167995 A1 | 6/2015 | Fadell et al. |
| 2015/0168949 A1 | 6/2015 | Hua et al. |
| 2015/0194043 A1 | 7/2015 | Dunn et al. |
| 2015/0198707 A1 | 7/2015 | Al-Alusi |
| 2015/0212717 A1 | 7/2015 | Nair et al. |
| 2015/0213222 A1 | 7/2015 | Amarasingham et al. |
| 2015/0213379 A1 | 7/2015 | Nair et al. |
| 2015/0216369 A1 | 8/2015 | Hamilton et al. |
| 2015/0253748 A1 | 9/2015 | Brun et al. |
| 2015/0281287 A1 | 10/2015 | Gill et al. |
| 2016/0061476 A1 | 3/2016 | Schultz et al. |
| 2016/0061477 A1 | 3/2016 | Schultz et al. |
| 2016/0061794 A1 | 3/2016 | Schultz et al. |
| 2016/0061795 A1 | 3/2016 | Schultz et al. |
| 2016/0063833 A1 | 3/2016 | Schultz et al. |
| 2016/0066067 A1 | 3/2016 | Schultz et al. |
| 2016/0116181 A1 | 4/2016 | Aultman et al. |
| 2016/0139067 A1 | 5/2016 | Grace |
| 2016/0253897 A1 | 9/2016 | Wildman et al. |
| 2016/0255516 A1 | 9/2016 | Hill et al. |
| 2016/0298864 A1 | 10/2016 | Ekolind et al. |
| 2016/0306934 A1 | 10/2016 | Sperry et al. |
| 2016/0314683 A1 | 10/2016 | Felch et al. |
| 2016/0328948 A1 | 11/2016 | Ferniany |
| 2016/0335731 A1 | 11/2016 | Hall |
| 2016/0367925 A1 | 12/2016 | Blackley |
| 2017/0024986 A1 | 1/2017 | Austin |
| 2017/0193792 A1 | 7/2017 | Bermudez Rodriguez et al. |
| 2017/0256155 A1 | 9/2017 | Sengstaken, Jr. |
| 2017/0280949 A1 | 10/2017 | Wildman et al. |
| 2017/0294106 A1 | 10/2017 | Thyroff |
| 2017/0365024 A1 | 12/2017 | Koch et al. |
| 2018/0016773 A1 | 1/2018 | Chandler et al. |
| 2018/0039246 A1* | 2/2018 | Ferro .............. G05B 19/048 |
| 2018/0151054 A1 | 5/2018 | Pi |
| 2018/0218591 A1 | 8/2018 | Easter |
| 2018/0293038 A1 | 10/2018 | Meruva et al. |
| 2018/0301014 A1 | 10/2018 | Worral et al. |
| 2018/0313695 A1 | 11/2018 | Shim et al. |
| 2018/0337958 A1 | 11/2018 | Nagarkar |
| 2018/0365957 A1 | 12/2018 | Wright et al. |
| 2019/0051138 A1 | 2/2019 | Easter |
| 2019/0094827 A1 | 3/2019 | Park et al. |
| 2019/0109928 A1 | 4/2019 | Krishnan |
| 2019/0139395 A1 | 5/2019 | Rogachev et al. |
| 2019/0209719 A1 | 7/2019 | Andersen et al. |
| 2019/0356513 A1 | 11/2019 | Schubert et al. |
| 2019/0377305 A1 | 12/2019 | Petrus et al. |
| 2020/0009280 A1 | 1/2020 | Kupa et al. |
| 2020/0028702 A1 | 1/2020 | Sawyer et al. |
| 2020/0033821 A1* | 1/2020 | Krishnamurthy ...... G05B 15/02 |
| 2020/0074836 A1 | 3/2020 | Kolavennu et al. |
| 2020/0090089 A1 | 3/2020 | Aston et al. |
| 2020/0146557 A1 | 5/2020 | Cheung et al. |
| 2020/0175105 A1 | 6/2020 | Falk et al. |
| 2020/0200420 A1 | 6/2020 | Nayak et al. |

FOREIGN PATENT DOCUMENTS

| | | |
|---|---|---|
| CN | 103110410 A | 5/2013 |
| CN | 103970977 A | 8/2014 |
| CN | 105116848 A | 12/2015 |
| CN | 108961714 A | 12/2018 |
| CN | 110009245 A | 7/2019 |
| CN | 110084928 A | 8/2019 |
| CN | 110827457 A | 2/2020 |
| EP | 1669912 A1 | 6/2006 |
| EP | 2310981 A1 | 4/2011 |
| EP | 1892921 B1 | 2/2016 |
| JP | 7085166 A | 3/1995 |
| JP | 11024735 A | 1/1999 |
| JP | 11317936 A | 11/1999 |
| JP | 2001356813 A | 12/2001 |
| JP | 2005242531 A | 9/2005 |
| JP | 2005311563 A | 11/2005 |
| KR | 1172747 B1 | 8/2012 |
| KR | 101445367 B1 | 10/2014 |
| KR | 1499081 B1 | 3/2015 |
| WO | 9621264 A3 | 11/1996 |
| WO | 2003040839 A1 | 5/2003 |
| WO | 2004029518 A1 | 4/2004 |
| WO | 2005045715 A2 | 5/2005 |
| WO | 2008152433 A1 | 12/2008 |
| WO | 2008157755 A1 | 12/2008 |
| WO | 2009012319 A2 | 1/2009 |
| WO | 2009079648 A1 | 6/2009 |
| WO | 2010106474 A1 | 9/2010 |
| WO | 2011025085 A1 | 3/2011 |
| WO | 2011043732 A1 | 4/2011 |
| WO | 2011057173 A2 | 5/2011 |
| WO | 2011123743 A1 | 10/2011 |
| WO | 2013062725 A1 | 5/2013 |
| WO | 2013178819 A1 | 12/2013 |
| WO | 2014009291 A1 | 1/2014 |
| WO | 2014098861 A1 | 6/2014 |
| WO | 2014135517 A1 | 9/2014 |
| WO | 2016109277 A1 | 7/2016 |
| WO | 2016123536 A1 | 8/2016 |
| WO | 2017057274 A1 | 4/2017 |
| WO | 2019046580 A1 | 3/2019 |
| WO | 2020024553 A1 | 2/2020 |

(56) References Cited

OTHER PUBLICATIONS

Winkler et al., "Improving Quality Assurance in Multidisciplinary Engineering Environments with Semantic Technologies" Chapter 8 from the book Quality Control and Assurance—An Ancient Greek Term ReMastered, Feb. 27, 2017. pp. 177-200 (Year: 2017).*
Sembroiz, D., et al., A novel cloud-based IoT architecture for Smart Building automation, Technical University of Catalonia (UPC)—Barcelona Tech., Department of Computer Architecture, Barcelona, Spain, Nov. 3, 2016 (22 pages).
Australian Examination Report No. 1 for standard patent application, AU Application No. 2021204170, dated Apr. 5, 2022 (4 pages).
Extended European Search Report, EP Application No. 21179633.9, dated Oct. 13, 2021 (15 pages).
CISCO, Johnson Controls, "Building automation System over IP (BAS/IP) Design and Implementation Guide", Aug. 18, 2008, V 8.1, p. 1-107.
Ghasemi, M.H. et al., "Computing in the Blink of an Eye: Current Possibilities for Edge Computing and Hardware-Agnostic Programming", IEEE Access, Special Section on Intelligent and Cognitive Techniquest for Internet of Things, Mar. 11, 2020, p. 41626-41636.
AU Examination Report No. 3 for standard patent application, Australian Patent Office, AU Application No. 2021204170, dated Nov. 30, 2022 (5 pages).
Olken et al., "Object Lessons Learned from a Distributed System for Remote Building Monitoring and Operation," ACM SIGPLAN Notices, vol. 33, No. 10, pp. 284-295, Oct. 1998.
Proliphix, Inc., "Proliphix IP Devices: HTTP API," 28 pages, Jan. 23, 2006.
Proliphix, Inc., "Remote Management User Guide," 12 pages, prior to Aug. 27, 2007.
Rogan et al., "Smart and Final Food Stores: A Case Study in Web Based Energy Information and Collection," Web Based Energy Information and Control Systems: Case Studies and Application, Chapter 6, p. 59-64, 2005.
Sharp, "Actius AL3DU 3D LC Display High Performance 3D Visualization," 2 pages, prior to Mar. 17, 2006.
So et al., "Building Automation on the Information Superhighway," ASHRAE Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Trane, "System Programming, Tracer Summit Version 14, BMTW-SVP01D-EN," 623 pages, 2002.
Lucid Design Group, Inc., "Building Dashboard," 2 pages, Printed May 30, 2013.
"America's Largest Managed Security Services Provider Launches Comprehensive, Integrated Covid-19 Safety Program for Office Buildings and Suites," KastleSafeSpaces, 5 pages, May 11, 2020.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Thermal Imaging SmartPhone Can Be used For Temperature Screening of People," CAT, 3 pages, accessed Jul. 13, 2020.
"Contact Tracing Now Available on Identiv's Hirsch Velocity Access Control Platform," IDENTIV, 5 pages, May 21, 2020.
Silva et al., "Cough localization for the detection of respiratory diseases in pig houses," ScienceDirect, 7 pages, May 28, 2008.
Dey et al., "Evaluation of Isolation Compliance Using Real Time Video In Critical Care," North Shore University Hospital, 1 page, Oct. 9, 2015.
"Facial Attendace System With Temperature Screening Now In India," IANS, 5 pages, Mar. 19, 2020.
"Plan to Re-Open," EHIGH, 16 pages, accessed Jun. 13, 2020.

"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
Honeywell, "INNCONTROL 5," 2 pages, Aug. 8, 2018.
"IP Door Access Control," Kintronics, 21 pages, 2014.
"Kogniz AI Health Response Platform," KOGNIZ, 9 pages, accessed May 21, 2020.
"Machine Learning Could Check If You're Social Distancing Properly at Work," MIT Technology Review, 7 pages, Apr. 17, 2020.
Punn et al., "Monitoring COVID-19 social distancing with person detection and tracking via fine-tuned YOLO v3 and Deepsort techniques," 10 pages, May 6, 2020.
Burt, "NEC launches dual face biometric and fever detection system for access control," Biometric Update, 4 pages, May 8, 2020.
"Remote temperature monitoring," AXIS Communication, 10 pages, 2014.
"FebriEye—AI Based Thermal Temperature Screening System," vehant, 1 page, 2020.
"See The World In A New Way Hikvision Thermal Cameras," HIKVISION, 12 pages, 2017.
Allain, "Trying out the iPhone Infrared Camera: The FLIR One," Wired, 15 pages, 2014.
Dasgupta, "Your voice may be able to tell you if you have Covid," Hindustan Times, 4 pages, Apr. 16, 2020.
Ganguty, "Gurugram-based startup Staqu has modified AI-powered JARVIS to battle coronavirus," Yourstory, 7 pages, Mar. 31, 2020.
Trane, "Creating Input/Output Objects," 196 pages, retrieved Jul. 10, 2020.
Trane, "Using the Graphing Control Editor," 181 pages, retrieved Jul. 10, 2020.
Bocicor et al. "Wireless Sensor Network based System for the Prevention of Hospital Acquired Infections", arxiv.org, Cornell University Ithaca, NY 14853, May 2, 2017, XP080947042, (Abstract).
Shhedi et al., "Traditional and ICT Solutions for Preventing the Hospital Acquired Infection", 2015 20th International Conference on Control Systems and Computer Science, IEEE, May 27, 2015, pp. 867-873, XP033188038.
Extended European Search Report, EP application No. 20151295.1, pp. 13, May 26, 2020.
U.S. Pat. No. 14,109,496 filed Dec. 17, 2013.
"What is the GE Nucleus Home Manager? How can a Home Manager Help with Energy Conservation?" GE Nucleus, 2 pages, printed Jan. 15, 2013. www.geappliances.com/home-energy-manager/about-energy-monitors.htm.
"Lucid Design Group—Building Dashboard Network—Apps," 7 pages, Jan. 15, 2013. www.luciddesigngroup.com/network/apps.php#homepage.
Preuveneers et al., "Intelligent Widgets for Intuitive Interaction and Coordination in Smart Home Environments," IEEE Eighth International Conference on Intelligent Environments, pp. 157-164, 2012.
Wu et al., "A Web 2.0 Based Scientific Application Framework," 7 pages, prior to Jul. 24, 2014.
"The Home Dashboard," CRBM info@hand website, 46 pages, prior to Apr. 25, 2013.
"Free Facilities Dashboards," eSight Energy Website, 2 pages, prior to Apr. 25, 2013.
Alerton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
E-homecontrols.com, "e-Home Controls Website," link to actual website no longer works, 1 page, prior to Dec. 19, 2013.
"C&C (/)—Omniboard," 5 pages, Dec. 19, 2013. http://www.ccbac.com.
"DomController Home Automation Software—Control Anything from Anywhere," 11 pages, printed Jan. 6, 2015. http://www.domcontroller.com/en/.

(56) References Cited

OTHER PUBLICATIONS

"Novar OPUS BAS," 1 page, prior to Feb. 13, 2013. http://www.novar.com/ems-bas/opus-building-automation-system.
"A 3D Interactive Environment for Automated Building Control," Master's Dissertation, Instituto Superior Tecnico, 120 pages, Nov. 2012.
Panduit Corp., "Enable a Building Automation with Panduit Enterprise Solutions," 4 pages, Nov. 2012.
Honeywell, "WEBs-AX Web-Enabled Building Solutions," sales brochure, Honeywell International Inc., Mar. 2009.
Honeywell, "Attune Advisory Services," press release, Honeywell International Inc., Mar. 20, 2012.
EnteliWEB Overview, web pages retrieved on May 9, 2013 from http://deltacontrols.com/products/facilities-management/supervisory-software et seq. by the Internet Archive at web.archive.org.
"BACnet Protocol Implementation Conformance Statement" for enteliWEB, Delta Controls, Jul. 17, 2013.
Castle, "7 Software Platforms that Make Building Energy Management Easy," http://greentechadvocates.com/2012/11/28/7-software-platforms-that-make-building-energy-managment-easy/, Nov. 28, 2012.
EnteliWEB "Software: Enterprise Energy Management", catalog sheet, Delta Controls, 2012.
EnteliWEB "Software: Enterprise Energy Management", catalog sheet, Delta Controls., 2010.
"Intelligent Building Management Systems in Miami," Advanced Control Corp., Mar. 7, 2013.
"The Ohio State University," BACnet International Journal, vol. 5, p. 4, Jan. 2013.
Bobker et al., "Operational Effectiveness in Use of BAS," Proceedings of the 13th International Conference for Enhanced Building Operations, Oct. 8, 2013.
Castelo, "A 3D Interactive Environment for Automated Building Control," Elsevier, Nov. 8, 2012.
"Creston Special Report: How Intelligent building management solutions are reducing operational costs," Creston, 2012.
"Building Automation Software Solutions," Iconics, 2013.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
"NiagraAX Product Model Overview," Tridium, Inc., 2005.
"An Overview of NiagraAX: A comprehensive software platform designed to create smart device applications," Tridium, Inc., 2005.
"Phoenix Controls Portal," Phoenix Controls, Inc., 2013.
Quirk, "A Brief History of BIM," Arch Daily, Dec. 7, 2012.
Samad et al., "Leveraging the Web: A Universal Framework for Building Automation," Proceedings of the 2007 American Control Conference, Jul. 11, 2007.
Sinha et al., "9 Key attributes of energy dashboards and analytics tools," Aug. 28, 2013, https://www.greenbiz.com/blog/2013/08/28/9-key-attributes-energy-dashboards-and=analytics-tools.
Sinopoli, "Dashboards For Buildings," http://www/automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
International Search Report and Written Opinion dated Jul. 17, 2018 for International PCT Application No. PCT/US2018/025189 (12 pages).
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
Donnelly, "Building Energy Management: Using Data as a Tool", http://www.buildingefficiencyinitiative.org/sites/default/files/legacy/InstituteBE/media/Library/Resources/Existing-Building-Retrofits/Using-Building-Data-as-a-Tool.pdf, Oct. 2012, 9 pages.
"ASHRAE Dashboard Research Project," 29 pages, Aug. 28, 2008.
Honeywell, "Energy Manager User Guide," Release 3.2, 180 pages, 2008.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
Honeywell, "Product Guide 2004," XP-002472407, 127 pages, 2004.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
Andover Controls, Network News, vol. 2, No. 2, 8 pages, 1997.
Andover Controls World, 4 pages, Spring 1997.
Bell et al., "Early Event Detection-Results from A Prototype Implementation," AICHE Spring National Meeting, 15 pages, Apr. 2005.
Cadgraphics, "The Cadgraphics User's Guide," 198 pages. 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chan, "Rank Revealing QR Factorizations," Linear Algebra and It's Applications, vol. 88-89, p. 67-82, Apr. 1987.
Circon, "i-Browse Web-Based Monitoring and Control for Facility Management," 2 pages, prior to Aug. 27, 2007.
Australian Application 2009904740, Published copy, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell Home and Building Control Bulletin, "Introduction of the S7350A Honeywell WebPAD Information Appliance," 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
"Remote Building Monitoring and Operations Home Page," 5 pages, prior to Aug. 27, 2007.
"Carrier: i-Vu CCN," 1 page, printed Mar. 11, 2008.
Carrier: 33CSCCNWEB-01 CCN Web Internet Connection to the Carrier Comfort Network, 1 page, printed Mar. 11, 2008.
"Products," 5 pages, printed Jul. 3, 2007. http://www.docs.hvacpartners.com/idc/groups/public/documents/techlit/gs-controls-ivuccn.rtf.

(56) References Cited

OTHER PUBLICATIONS

Lightstat Incorporated, "Internet Programmable Communicating Thermostats," 1 page, printed Mar. 13, 2007. http://www.lightstat.com/products/istat.asp.
Sharp, "Actius RD3D Desktop Replacement Notebook with Industry-Breakthrough 3D Screen," 1 page, printed Jun. 16, 2005. http://www.sharpsystems.com/products/pc_notebooks/actius/rd/3d/.
"Lights On A Wireless Lighting Control System," 11 pages, printed Mar. 22, 2007 http://www2.sims.berkeley.edu/courses/is213/s06/projects/lightson;final.html.
I.Lon 100e3 Internet Server, 1 page, prior to Aug. 27, 2007.
I.Lon, SmartServer, 2 pages, prior to Aug. 27, 2007.
I-stat, Demo Screen Shots, 9 pages, printed Mar. 13, 2007.
I-stat, The Internet Programmable Thermostat, 2 pages, prior to Aug. 27, 2007.
Ball, "Green Goal of 'Carbon Neutrality' Hits Limit," TheWall Street Journal, 7 pages, Dec. 30, 2008.
Network Integration Engine (NIE), Johnson Controls, 3 pages, Nov. 9, 2007.
Network Integration Engine (NIE), Product Bulletin, Johnson Controls, pp. 1-11, Jan. 30, 2008.
Kourti, "Process Analysis and Abnormal Situation Detection: From Theory to Practice," IEEE Control Systems Magazine, p. 10-25, Oct. 2002.
Mathew, "Action-Oriented Benchmarking, Using CEUS Date to Identify and Prioritize Efficiency Opportunities in California Commercial Buildings," 26 pages, Jun. 2007.
Morrison et al., "The Early Event Detection Toolkit," Honeywell Process Solutions, 14 pages, Jan. 2006.
Narang, "WEBARC: Control and Monitoring of Building Systems Over the Web," 53 pages, May 1999.

\* cited by examiner

PLATFORM AGNOSTIC SYSTEMS AND METHODS FOR BUILDING MANAGEMENT SYSTEMS

This application claims the benefit of U.S. Provisional Application No. 63/039,366, filed Jun. 15, 2020 and U.S. Provisional Application No. 63/044,885, filed Jun. 26, 2020, both of which are hereby incorporated by reference.

TECHNICAL FIELD

The present disclosure relates generally to devices, methods, and systems for configuring and operating building management systems. More particularly, the present disclosure relates to devices, methods, and system for configuring, monitoring, and servicing building management systems.

BACKGROUND

Building management systems often include and/or are deployed to control various electrical and electromechanical components and/or systems of or installed at a building. Example components and/or systems installed in a building include, but are not limited to, heating, ventilation, and air conditioning (HVAC) systems and components thereof, surveillance systems and components thereof, security systems and components thereof, etc. Building systems of or for control by a building management system may include devices from a single company configured to communicate and/or operate using a single, common protocol; however, often times a building management system may include devices from various companies and/or devices configured to communicate and/or operate on a different protocol than one or more other devices of the building system. Building systems controlled and/or monitored by a building management system may be located at a single building and/or two or more buildings located adjacent one another and/or geographically spaced apart.

SUMMARY

The present disclosure generally relates to configuring building management systems, and more particularly, to configuring, monitoring, and servicing of a building management system using a common building management system model.

In one example, a Building Management System (BMS) for controlling a plurality of devices installed at a building may include a common model and a gateway. The common model may be accessible and configurable by one or more technicians during setup of the BMS for the building. The common model may enforce standardized device names and standardized point names that are hardware agnostic for the plurality of devices installed at the building and may define an ontology of the plurality of devices installed at the building. The common model may be configured to receive hardware agnostic point information and provide hardware agnostic control commands for controlling the plurality of devices installed at the building. The gateway may be communicatively coupled to one or more of the devices installed at the building. The gateway may be configured to receive point information from the one or more of the devices installed at the building and convert the received point information into hardware agnostic point information before sending the hardware agnostic point information to the common model. Further, the gateway may be configured to receive hardware agnostic control commands from the common model and convert the received hardware agnostic control commands into hardware specific control commands before sending the hardware specific control commands to the appropriate devices installed at the building.

In another example, a method for setting up a Building Management System (BMS) for controlling a plurality of devices installed at a building may be provided. The method may include retrieving a common model, using one or more predefined templates of the common model to create the plurality of devices in the common model, and linking the common model to a gateway at the building. The predefined templates may define one or more of data points, control parameters, schedule configurations, and alarm configurations for the corresponding devices. Further, the predefined templates may enforce standardized device names and standardized point names that are hardware agnostic. Once the common model is setup, the common model may be configured to receive hardware agnostic point information and provide hardware agnostic control commands for controlling the plurality of devices.

In yet another example, a non-transitory computer readable medium storing instructions that when executed by a processor may cause the processor to retrieve a common model for use in controlling a plurality of devices in a building, allow a user to use one or more predefined templates of the common model to create the plurality of devices in the common model, and allow the user to link the common model to a gateway at the building. Once setup, the common model may be configured to receive hardware agnostic point information from the gateway and provide hardware agnostic control commands to the gateway for controlling the plurality of devices. The predefined templates may define one or more of data points, control parameters, schedule configuration, and alarm configuration for the corresponding devices. Further, the predefined templates may enforce standardized device names and standardized point names that are hardware agnostic.

DESCRIPTION

Figure 1:
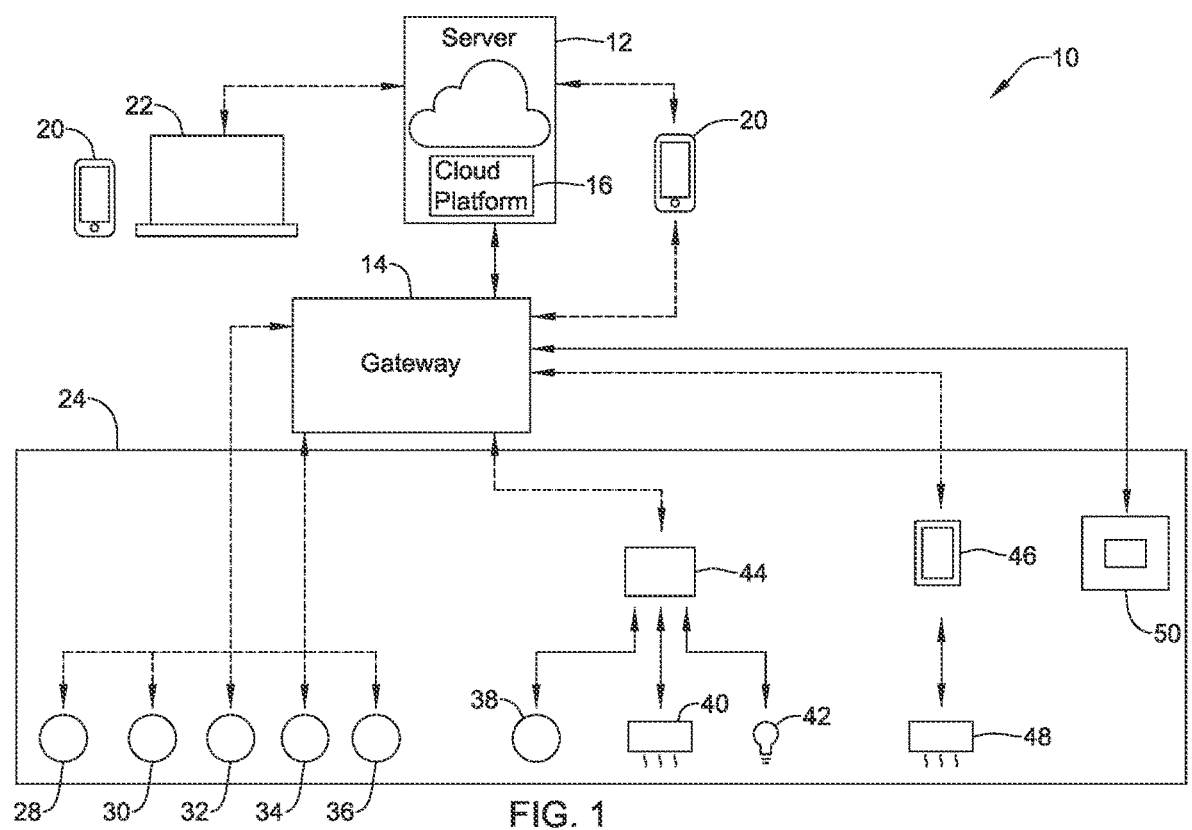
FIG. 1 is schematic diagram of an illustrative building management system.

The present system and approach may incorporate one or more processors, computers, controllers, user interfaces, wireless and/or wire connections, and/or the like, in an implementation described and/or shown.

Building management systems may include one or more models of one or more related building systems to facilitate monitoring and/or controlling devices of the building systems. Example building systems and devices include, but are not limited to, HVAC systems, controllers, thermostats, dampers, air handling units (AHU), roof top units (RTU), variable air volume systems (VAV), particle sensors, gas sensors (e.g., volatile organic compounds (VOC) sensors and/or other suitable gas sensors), humidity sensors, temperature sensors, carbon dioxide sensors, carbon monoxide sensors, variable refrigerant flow (VRF) systems, and/or one or more other suitable building systems and/or devices.

A building management system supervisor may be implemented to facilitate an organization interacting with its building management system. The supervisor may include graphics pages, schedules, histories, trends, etc. for the building management system and devices thereof. Three types of building management system supervisor deployments may exist and may be determined based on a size, footprint, and/or factor relevant to an organization. The types include a single-site type, a multi-site type, and a cloud based deployment type. In a single site, a standalone deployment of a building management system supervisor may be installed on a premise of an organization location either as an embedded supervisor or installed on a computing device which may communicate with controllers and/or field devices. In a large site or multi-site type, deployment of the building management system supervisor may be at a data center so as to be scalable. In a cloud based deployment of a building management system supervisor, a portion of or the complete supervisor may be hosted in the cloud and may communicate with installed devices via one or more network connections.

Building management systems may include a system model of the building systems of one or more buildings. The system model may be utilized in different phases of using the building management system including, but not limited to an installation phase, an engineering phase, a commissioning phase, an operation phase, a maintenance phase, and/or one or more other suitable phases of using the building management system. In some cases, the system model may facilitate field technicians with installing and/or configuring building devices (e.g., gateways (e.g., a plant controller), controllers, thermostats, etc.) that may be responsible for controlling building equipment (e.g., VRF systems, AHUs, lighting, etc.). Building devices and building equipment may referred to herein collectively as devices, equipment, and/or devices and equipment.

System models for building management systems may provide system details and a hierarchy of locations, devices, and equipment for creating, installing, and operating the building management systems. System models may be accessible and configurable by one or more technicians during a setup and/or during operation of a building management system for one or more buildings. Further, the system model may support a building or facility manager in monitoring and/or controlling devices at a building. In one example, the system model may facilitate a building manager in monitoring and/or controlling one or more sites at different levels of an organization hierarchy (e.g., at a state level, at a region level, at a country level, etc., which may differ in each organization and/or system model). Additionally or alternatively, the system model may facilitate a technician in trouble shooting issues in devices and/or equipment by providing details related to the device and the noted issue (e.g., by providing details of applications present in relevant devices, details of the devices, details of equipment controlled by a device, etc.).

System models may be hardware and/or software specific. For example, a system model may specify one or more communication and/or operational protocols supported by a device or piece of equipment, specify one or more application structures supported by firmware present in a device or piece of equipment, aid in handling one or more limitations of the hardware and/or software of a device (e.g., a maximum number of data points supported, types of data points supported, application size limits, etc.). As a result, the system model may only be suitable to configure and/or install specified products, which may make it difficult to have a seamless solution for all devices and equipment provided by one or more manufacturers of the devices and equipment across multiple phases of a building management system development, implementation, operation, and/or other suitable phases. Due to the specified nature of system models for building management systems, users and/or user tools (e.g., hardware and/or software tools) may need to re-enter the same data or utilize a manual mechanism (e.g., exporting and/or importing data), which is prone to error. As a result, it is desirable to utilize a system model (e.g., a common model) that is agnostic to which manufacturer provides a device and/or a protocol on which the device operates.

The system model may be configured to enforce standardized device names and/or standardized point names that are hardware agnostic for a plurality of devices and/or equipment installed at one or more buildings of an organization utilizing the building management system. Further, the system model may receive hardware agnostic point information and provide hardware agnostic control commands for controlling the plurality of devices and/or equipment installed at the one or more buildings.

FIG. 1 depicts a schematic over view of a building management system (BMS) 10. The building management system may have, include, and/or be in communication with one or more devices, device access mechanisms, and/or equipment at one or more building sites and/or locations. All or at least some of the devices, device access mechanisms, and/or equipment may be, may include, and/or may be configured to communicate with computing devices.

Example devices of the BMS 10 may include, but are not limited to, a server 12 (e.g., a remote server, a local server, and/or one or more other suitable server), a hub and/or gateway 14 (e.g., a Modbus gateway, a Zigbee hub, Beats gateway) for facilitating a connection between the equipment and the server 12, and/or other suitable devices. Example device access mechanisms of the BMS 10 may include, but are not limited to, a cloud platform 16, a web portal (e.g., a web application, a website, etc.) for accessing the BMS 10 from a mobile device 20, computer 22 (e.g., a laptop, a personal computer (PC), etc.), and/or other suitable computing device. Example equipment for a building 24 operating within the BMS 10 may include, but are not limited to, a lighting level sensor 28, a motion detection sensor 30 (e.g., a PIR sensor and/or other suitable motion detection sensor), a VOC sensor 32, a temperature/humidity sensor 34, a $CO_2$ sensor 36, a sensor 38 in communication with an input/output (I/O) port 44 (e.g., a smart I/O portion, a communications port, etc.), a VRF unit 40, lighting 42, a thermostat 46, an RTU 48, a meter 50 (e.g., an energy meter and/or other suitable meter), and/or one or more other suitable pieces of equipment. Although FIG. 1 depicts the BMS 10 including the server 12 being remote from the computer 22, the BMS may be implemented in the computer 22 and/or one or more other suitable computers that are local and/or remote from one or more buildings 24 within the BMS 10. Further, although the BMS 10 depicted in FIG. 1 shows equipment at a single building, the BMS 10 may be configured to span across two or more buildings and/or locations.

Figure 2:
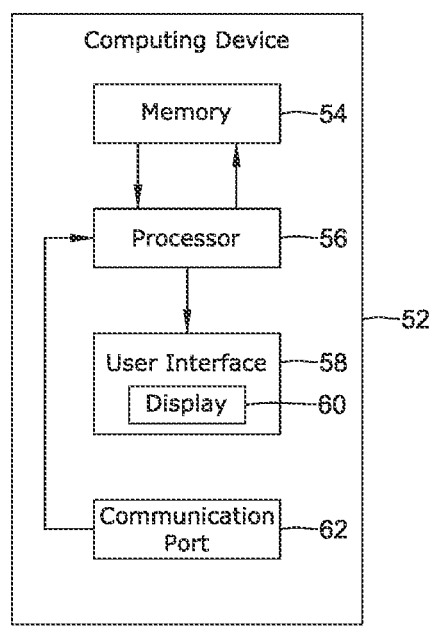
FIG. 2 is a schematic block diagram of an illustrative computing device.

FIG. 2 illustrates an example of a computing device 52 that may be or may be included in the computing devices discussed herein. The computing device 52 may represent all or part of one or more of the devices, device access mechanisms, and/or pieces of equipment of the BMS 10, and/or tools utilized with and/or to communicate with the BMS 10. The computing device 52 may be and/or may be part of, for instance, a smart phone, a tablet, a personal digital assistant (PDA), a personal computer, a beacon, a camera, a display device, a video recorder, a network component, and/or other suitable computing device. However, configurations of the present disclosure are not limited to a particular type of computing device 52.

As shown in FIG. 2, the computing device 52 may include memory 54 and a processor 56 that may communicate with one another such that the processor 56 may execute instructions (e.g., application program code of a mobile application or software, among other instructions) stored on the memory 54. The computing device 52 may further include a user interface 58, a communications port 62, and/or one or more other suitable components.

The memory 54 may be any type of storage medium that can be accessed by the processor 56 to perform various examples of the present disclosure. For example, the memory 54 may be a non-transitory computer readable medium having computer readable instructions (e.g., computer or application program instructions) stored thereon that are executable by the processor 56 for performing one or more methods or techniques described herein.

The memory 54 may be may be volatile or nonvolatile memory. The memory 54 may also be removable (e.g., portable) memory, or non-removable (e.g., internal) memory. For example, the memory 54 may be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although the memory 54 is illustrated as being located in the computing device 52, embodiments of the present disclosure are not so limited. For example, the memory 54 may also be located internal to another computing resource (e.g., enabling computer readable instructions to be downloaded over the Internet or another wired or wireless connection).

The processor 56 of the computing device 52 may include a single processor or more than one processor working individually or with one another (e.g., dual-core, etc.). The processor 56 may be configured to execute instructions, including instructions that may be loaded into the memory 54 and/or other suitable memory. Example processor components may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The user interface 58, when provided, may be any suitable user interface and/or user interface components configured to facilitate a user of the computing device 52 interacting with the computing device 52 via the user interface 58. For example, the user interface 58 may be used to provide information to and receive information from the user of the computing device 52. For instance, the user interface 58 may receive selections of equipment and equipment settings, provide notifications of events and/or alerts, etc. The user interface 58 may include a keyboard or keyboard functionality, a pointer (e.g., a mouse, touch pad, or touch ball) or pointer functionality, a microphone, a speaker, a light system, a haptic system, a camera, a video camera, and/or other suitable user interface features the user may use to input information into and/or receive information from the computing device 52. Configurations of the present disclosure, however, are not limited to a particular type(s) of user interface 58.

In some cases, the user interface 58 may include a graphical user interface (GUI) that may have a display 60 (e.g., a screen) that may provide and/or receive information to and/or from the user of the computing device 52. The display 60 may be, for instance, a touch-screen (e.g., the GUI may include touch-screen capabilities).

The communications port 62 may be any type of communication port(s) and may facilitate wired and/or wireless communication with one or more networks. In one example, the communications port 62 may facilitate communication with one or more networks and/or other devices (e.g., sensors, equipment, other computing devices, mobile devices, servers, and/or other suitable devices) through any suitable connection including, but not limited to, radio communication, Ethernet, cellular communication, ZigBee, REDLINK™, Bluetooth, Bluetooth, Modbus, Beats, Low Energy (BLE), WiFi, IrDA, dedicated short range communication (DSRC), EnOcean, Near Field Communication (NFC), and/or any other suitable common or proprietary wired or wireless protocol. In one example, the communications port 62 may at least include a port configured to communicate over a Wi-Fi and/or Bluetooth connection with one or more pieces of building equipment (e.g., temperature sensors, thermostats, controllers, etc.)

Figure 3:
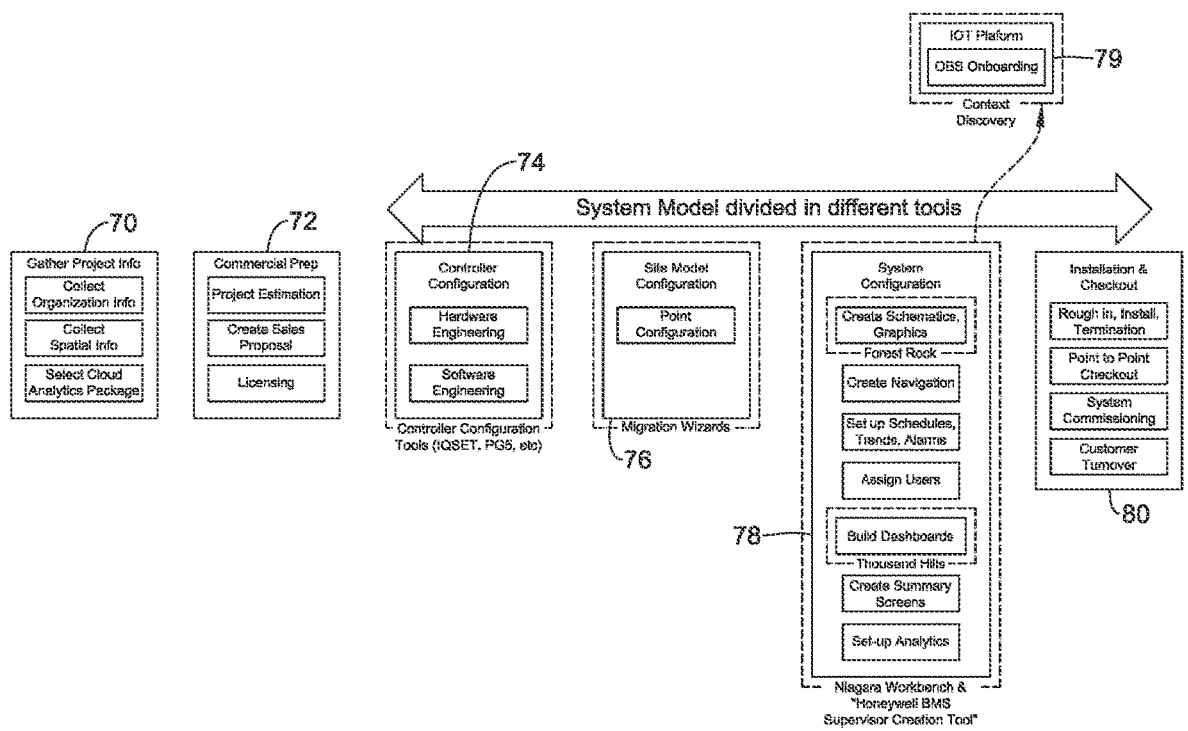
FIG. 3 is a schematic block diagram of illustrative phases for creating and implementing a system model for a building management system.

FIG. 3 depicts a block diagram of example phases of creating and implementing a system model of the BMS 10. Example phases of creating and implementing the system model of the BMS 10 may include at least one or more of a first phase 70 of gathering project information, a second phase 72 of commercial preparation, a third phase 74 of controller configuration, a fourth phase 76 of site model configuration, a fifth phase 78 of system configuration, and a sixth phase 80 of installation and checkout.

The first phase 70, gathering project, information may include one or more steps. The one or more steps of the first phase 70 may include, but are not limited to, collecting organization information relating to the organization of the company utilizing the BMS 10, collecting spatial information for the building sites of the company utilizing the BMS 10, selecting a cloud analytics package for analyzing, operating, and maintaining the BMS 10, etc.

The second phase 72, commercial preparation, may include one or more steps. The one or more steps of the second phase 72 may include, but are not limited to, project estimation to define the scope and the cost of creating, implementing, and/or maintaining the BMS 10, creating a sales proposal with the project estimation, licensing, etc.

The third phase 74, controller configuration, may include one or more steps. The one or more steps of the third phase 74 may include, but are not limited to, hardware engineering, software engineering, etc. In some cases, the hardware engineering and/or software engineering may include identifying the equipment needed for the BMS 10 and creating configurations for controllers using various tools (e.g., IQSET, PG5, etc.).

The fourth phase 76, site model configuration, may include one or more steps. The one or more steps of the fourth phase 76 may include, but are not limited to, point configuration, etc. In some cases, the point configuration may utilize a migration wizard tool that migrates information from the third phase 74 to the fourth phase 76 to identify data points needed to operate the equipment and maintain the BMS 10.

The fifth phase 78, system configuration, may include one or more steps. The one or more steps of the fifth phase 78 may include, but are not limited to, creating schematics, graphics, etc. for the system model of the BMS 10, create a navigation structure through the various components of the BMS 10 (e.g., sites, devices, equipment, etc.), set up schedules, trends, alarms for operating and/or maintaining devices of the BMS 10, assign users to various portions of the system model (e.g., as access rights, etc.), build dashboards for interacting with the BMS 10 to operate and/or maintain the BMS 10, create summary screens to provide summaries of the operation and/or maintenance of the BMS 10, set up analytics for operating, monitoring, and/or maintaining the BMS 10, etc. In some cases, NIAGARA™ workbench and/or HONEYWELL™ BMS Supervisor creation tool may be utilized for the fifth phase 78.

The sixth phase 80, installation and checkout, may include one or more steps. The one or more steps of the sixth phase 80 may include, but are not limited to, rough-in and install devices of the BMS 10, provide a point-to-point checkout of the devices, provide system commissioning, turnover the system to the company utilizing the BMS 10. In some cases, users may operate and/or maintain the equipment at one or more building sites utilizing the BMS 10 through a supervisor user interface providing access to the system model.

Generally, various tools are utilized at different phases of the system model creation and implementation to access and/or configure the system model. In some cases, the various tools may be configured to directly access and update the system model. The various tools may be configured to run on mobile devices and/or other suitable devices.

In some cases, the tools used to create and implement the system model may utilize a context discovery feature 79 which may parse names of data points to building contextual information for equipment types, data point roles, control parameter usage, etc., but such context discovery features may be prone to error and require manual review and entry because the data points parsed do not follow a standard naming protocol. As a result, a hardware/software agnostic manner of preparing a system model for the BMS 10 has been developed that offers a seamless solution for developing, installing, configuring, monitoring, and/or servicing the BMS 10, where the BMS 10 utilizes devices from different product lines and/or different manufacturers, without users having to manually monitor the results of context discovery features and/or manually enter information at each phase of the system model development.

The system model (e.g., the common model) for the BMS 10 may include various features and/or details of the BMS 10 that allows for creation and implementation of the BMS 10 without a need to utilize a migration tool and/or manually entering information at various phases of the system model creation that were entered at previous phases. The features and/or details of the BMS 10 provided in the system model may include, but are not limited to, one or more of a site hierarchy model (e.g., an organizational hierarchy such as one or more portfolios→one or more regions→one or more countries→one or more sites and/or other suitable site hierarchy model created based on a structure followed in an organization utilizing the BMS 10), spatial hierarchy and/or spatial elements (e.g., a space configuration at a site, such as a building, where the site may be split up by one or more floors→one or more zones→one or more rooms, etc.), elements (e.g., devices and/or equipment of the BMS 10) that may be defined as generic structure that may contain only equipment details and reference to a spatial location at which the equipment is installed, but not specific details depending on a manufacturer and/or protocol of the equipment, property set up (e.g. details of data points, control parameters of the application, etc.), installed locations of at least some of the devices installed in the buildings, alarm configuration (e.g., configuration of alarms that need to be raised in case of undesired operation of and/or of components of the BMS 10 (e.g., a high and/or low limit for temperature and/or other suitable alarm configurations)), schedule configuration (e.g., automated time-based control of equipment of the BMS 10), etc.

In some cases, the system model as it is being developed and when it is completed may be stored on the cloud and/or at a central database that may be accessible by different tools utilized for the different phases of system model development. Utilizing a single database or location for storing the system model as it is being developed and/or once it is completed, may facilitate utilizing a single ontology for developing the system model and ensuring tools for the different phases of the system model receive updated and complete information without requiring manual re-entry by users of already provided information.

The single ontology may define a generic naming structure based on standard definitions of equipment. Rather than providing specific product naming to equipment, the single ontology may define standard equipment type name such as AHU, VRF, lighting, thermostat, etc. and standard data point roles (e.g., ZoneTemperature, ZoneHumidity, etc.) independent of manufacturer and operational protocols. In some cases, the model may support storing data based on a standard protocol (e.g., BACnet, Modbus, etc.) in custom attributes used by equipment when configurations in the system model are pushed to the equipment, but this is not required and the system model may be protocol agnostic.

To facilitate creating system models and/or adding to system models using the single ontology, the tool (e.g., a website, a web application, etc.) used to create and/or add to system models may utilize templates to create sites, devices, and/or equipment in the system model. The templates may include drop down menus and/or other selectable or automatically implemented elements to create devices and/or equipment in the system model (e.g., a sample "lighting" equipment template that may require monitoring of temperature in a zone, and occupancy, may utilize generic names "OccupancySensor", "NetworkOverride", "Status", "ZoneTemperature", along with associated parameters). A system model created in such away may be operationally ready and available out of the box, such that gateway devices may translate the generic names of devices and/or equipment to protocols utilized by the devices and equipment provided by one or more manufacturers and/or that operate on two or more protocols.

The gateway may be software-based and/or hardware based. Further, the gateway may be part of a cloud service and/or a separate device at a building and/or a site.

In operation, the BMS 10 may be monitored using a web application, a website, a web portal, and/or other suitable portal. Such a portal may be called a "supervisor portal" and any additions or modifications made at the supervisor portal may adhere to the standard definitions based on the single ontology. Moreover, devices, equipment, and data provided in the view of the supervisor portal may follow the standard definitions and single ontology.

Figure 4:
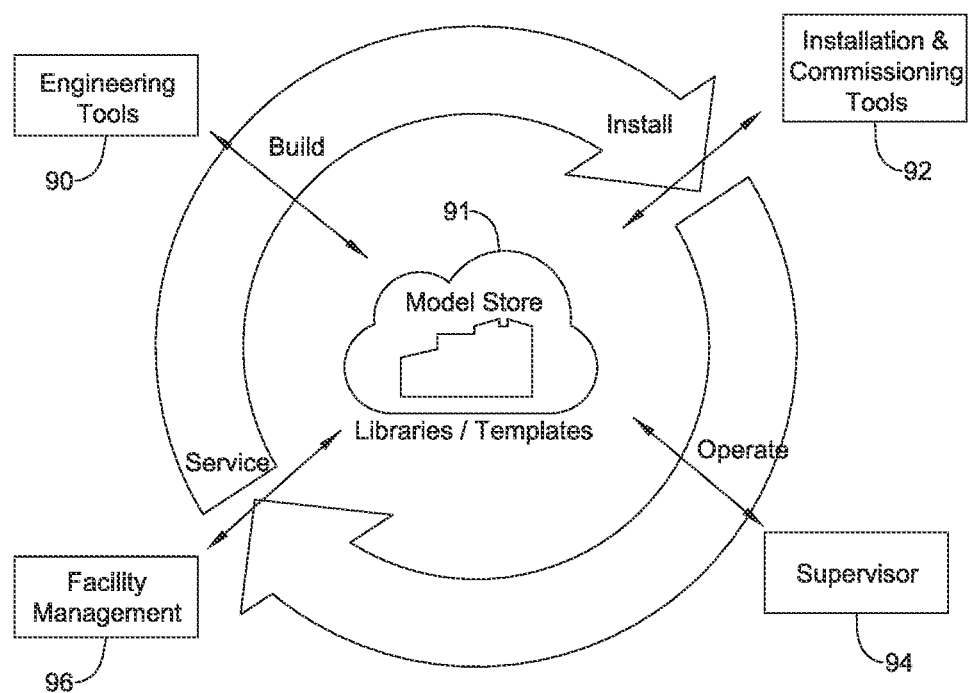
FIG. 4 is a schematic diagram of an illustrative cycle of creating, implementing, and maintaining a system model of a building management system.

FIG. 4 is a schematic view of how the system model of the BMS 10, which utilizes the standard definitions and single ontology, may be created and/or utilized. Engineering tools 90 may be utilized to create, build, and/or add to the system model of the BMS 10. The engineering tools may be software tools accessed via mobile devices, where the engineering tools 90 may be utilized to build the system model from one or more common templates stored at a central database 91 (e.g., where the central database 91 may be in the cloud as a cloud server, at an organizational computing device at one or more building locations of the organization, and/or at one or more other suitable locations). Installation and commissioning tools 92 may be utilized to install the system model from the central database 91 into the devices of or in communication with the BMS 10. Further, a supervisors 94 may access the supervisor portal of the system model and BMS 10 from the central database 91. Service of the BMS 10 may be provided via facility management 96 through a web portal and interacting with the system model having the generic naming structure.

In operation, data from the devices of the BMS 10 may be provided to the gateway in the generic naming structure and/or a naming structure specific to a device or equipment. The gateway may translate any device-type specific data into the generic naming structure of the system model and save the data at the central database 91 and/or at a database in communication with the central database 91. The data may then be presented to a user via the supervisor portal (e.g., from the central database 91) using the generic naming structure and the control of devices may be implemented and/or modified by a user via the supervisor portal.

Because the engineering tools 90, the installation and commissioning tools 92, the supervisor 94, and the facility management 96 are accessing system models utilizing a single ontology and naming structure, there is no need for manual re-entry of data from tool to tool. Instead, tools are able to seamlessly integrate data as needed and control and maintenance from a supervisory level may be done independent of or agnostic to a particular device type or protocol type.

Figure 5:
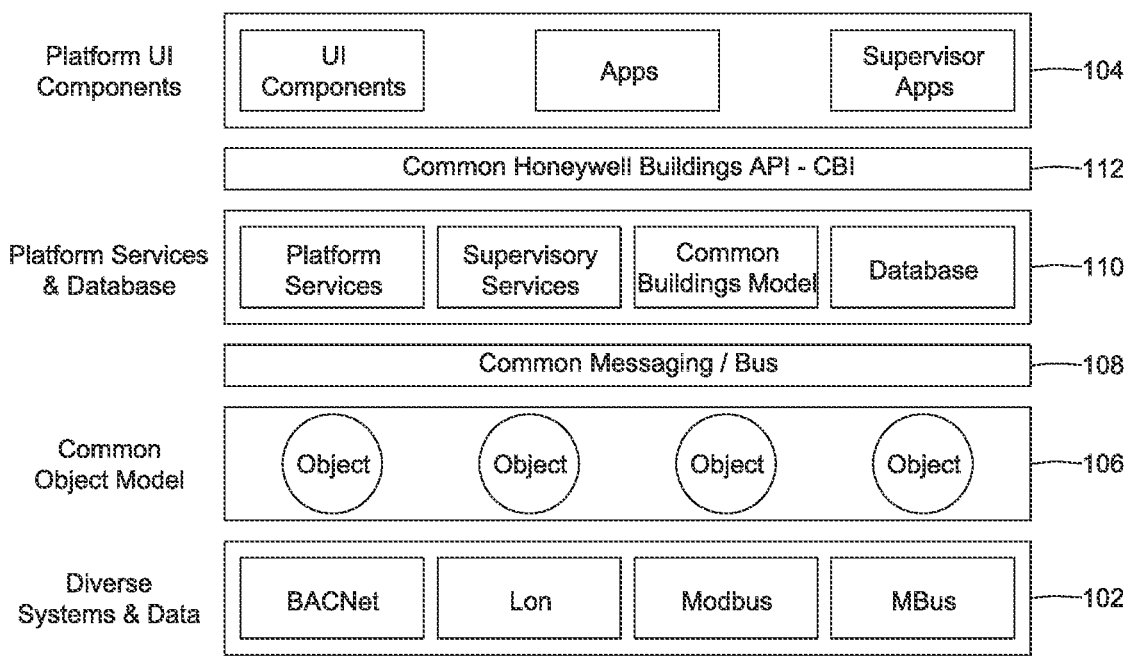
FIG. 5 is a schematic block diagram of an illustrative building management system operation.

FIG. 5 is a box diagram schematically depicting the flow of information between devices 102 and user tools 104. The device and/or equipment 102 may utilize various protocols including, but not limited to, BACnet, LON, LonWorks, Modbus, MBus, DALI, KNX, EnOcean, Ethernet, Zigbee, Wifi, Redlink, and/or other suitable protocols. In some cases, the devices may be provided by one or more different building management and/or automation companies including, but not limited to Honeywell, Trend, SBC, Centraline, Inncom, Alerton, Webs, etc. The data from and/or the configurations of devices and/or equipment utilizing the protocols may be provided to a gateway 106 having a common object model (e.g., the common object model may be utilized to translate protocol specific information into the general names based on the single ontology).

The gateway 106 may provide one or more functions. For example, the gateway 106 may perform a protocol normalization (e.g., to one of BACnet, LonWorks, Modbus, etc.), transform and/or normalize data formats, protocols, drivers, etc. (e.g., provide device hardware agnostic point information and translate device hardware agnostic point information into hardware specific point information for controlling the hardware (e.g., devices installed at the one or more buildings)), provide migration tools, perform context analytics, and provide a connection to the cloud through which the system model at the central database may receive hardware agnostic point information.

In operation, the gateway 106 may be communicatively coupled to one or more devices and/or pieces of equipment installed at one or more buildings utilizing the BMS 10 and the central database (e.g., the central database 91 or other suitable central database 91). The gateway 106 may be configured to receive point information and/or other suitable data from the one or more devices installed at the one or more buildings and convert the received point information into hardware agnostic point information before sending the hardware agnostic point information to the system model. Further, the gateway 106 may be configured to receive hardware agnostic control commands from the system model and convert the received hardware agnostic control commands into hardware specific control commands before sending the hardware specific control commands to the associated devices and/or pieces of equipment installed at the one or more buildings.

The gateway 106 may be located at a building of the one or more building and/or at the central database 91. In one example the gateway 106 may be installed at a building of the one or more buildings, such that the gateway 106 may communicate with the central database 91 over one or more network connections.

From the gateway 106, a single common messaging system or bus 108 may be utilized to provide the general interactions between the gateway(s) 106 to the cloud or centralized services/platform/database 110. The single common messaging system or bus 108 may utilize standard internet of things (IoT) protocols like MQTT/AMQP and/or other suitable protocols.

The centralized services/platform/database 110 may include, among other features, platform services, supervisory services, the system model (e.g., a common building model), administrative services, model services, a database, tool APIs, and/or other suitable features. The supervisory services may include, but are not limited to, one or more of alarm/event services, history services, scheduling services, analytics services, point read/write services, OTA (over the air) updates, COV/subscription notifications, etc. The administrative services may include, but are not limited to, one or more of user/organization CRUD, RBAC, licensing APIs, subscription APIs, etc. The model services may include, but are not limited to, one or more of model CRUD, model sync, model discovery, context discovery. Features of the tools API may include, but are not limited to, common templates, common libraries, translation APIs, etc. In some cases, the services and/or features provided by the cloud or centralized services/platform/database 110 may be considered to be and/or may utilize microservices.

Users may interact with the information and/or the system model of the BMS 10 with user tools 104 (e.g., a supervisory web portal) through a common API 112 and/or other suitable components. The user tools 104 may be based on microservice applications, but this is not required. The user tools 104 may include user interface components, web applications, supervisor web applications, etc. In some cases, the user tools 104 may provide and/or allow FM/operator/occupant features including, but not limited to, one or more of hierarchy/system navigation, a trend viewer, alarm management, dashboard/graphics, schedule management, analytics applications, energy management, etc. In some cases, the user tools 104 may provide and/or allow Administrative features including, but not limited to, one or more of user/role management, organization/customer onboarding, licensing, subscription management, etc. In some cases, the user tools 104 may provide and/or allow system life cycle features including, but not limited to, one or more of install features, time and/or operational estimate features, engineering features, commissioning features, check out features.

Figure 6:
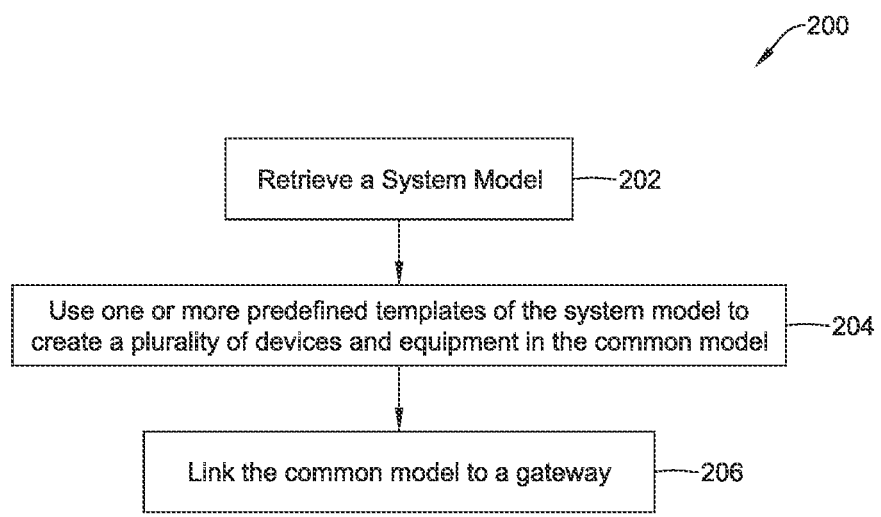
FIG. 6 is a schematic flow diagram of an illustrative method of setting up a building management system for controlling a plurality of devices and/or equipment installed at one or more buildings.

FIG. 6 depicts a schematic flow diagram of an illustrative method 200 of setting up a building management system (e.g., the BMS 10 and/or other suitable BMS) for controlling a plurality of devices installed at one or more buildings of an organization that may utilize the building management system. The method 200 may include retrieving 202 a system model (e.g., a common model). In some cases, the system model may be retrieved from a central database (e.g., the central database 91) and may define one or more predefined templates. The one or more predefined templates may define a general naming structure for one or more of data points, control parameters, schedule configurations, alarm configurations and/or for one or more other suitable component of the building management system for corresponding or associated devices and/or equipment. The general naming structure may enforce standardized device and equipment names and standardized point names that may be hardware agnostic.

The predefined templates of the system model may be used 204 to create a plurality of devices and/or equipment located at the one or more buildings within the system model in a hardware and/or protocol agnostic manner. In some cases, the predefined templates may be accessed, selected, and/or configured using a mobile device and/or other suitable device that is operatively coupled to the system model over one or more networks.

Once created, the system model may be linked 206 to one or more gateways (e.g., the gateways 106 and/or other suitable gateways). Once linked, the system model may be configured to receive hardware agnostic point information and/or other suitable information from the gateway and/or provide hardware agnostic control commands for controlling the plurality of devices and/or equipment added to or represented in the system model of the building management system to the gateway.

The gateways may be communicatively coupled to the one or more devices and/or equipment installed at the one or more buildings. The gateways may be setup or otherwise configured to receive point information and/or other suitable information from the one or more devices and/or equipment installed at the one or more buildings and convert the received point information and/or other suitable information into hardware agnostic point information and/or other suitable information before sending the information to the system model. Additionally or alternatively, the gateway may be setup or otherwise configured to receive hardware agnostic control commands from the system model (e.g., as initiated via a supervisor application) and convert the received hardware agnostic control commands into hardware specific control commands (e.g., hardware type- and/or protocol-specific control commands) before sending the hardware specific control commands to the appropriate devices and/or equipment installed at the one or more buildings.

The gateways may be located at one or more buildings of an organization utilizing the building management system. The gateway, however, may be located at one or more other suitable locations including, but not limited to, in the cloud.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

What is claimed is:

1. A Building Management System (BMS) for controlling a plurality of devices installed at a building, the BMS comprising:
    a system model that is configured to be used in controlling the plurality of devices installed in the building, the system model is further configured to be developed and implemented in stages using templates with selectable elements to adhere to a single ontology of the plurality of devices installed at the building during different phases of use of the BMS including two or more of installation, engineering, commissioning, operation, and maintenance, wherein different tools utilizing the templates are used by technicians to develop and implement the system model during each of the two or more different phases, where the system model is:
        (1) configured to be directly accessed and updated by the different tools used by technicians when developing and implementing the system model during the different phases including two or more of installation, engineering, commissioning, operation, and maintenance;
        (2) structured to enforce standardized device names and standardized point names that are hardware agnostic for the plurality of devices installed at the building for use by the different tools when developing and implementing the system model;
        (3) configured to define the single ontology of the plurality of devices installed at the building so that the different tools used by technicians when developing and implementing the system model receive updated and complete information without requiring manual re-entry by technicians of already provided information; and
        (4) configured to receive hardware agnostic point information from a gateway and provide hardware agnostic control commands to the gateway for controlling the plurality of devices installed at the building;
    the gateway communicatively coupled to the system model and one or more of the plurality of devices installed at the building, the gateway configured to:
        receive point information from the one or more of the plurality of devices installed at the building and convert the received point information into hardware agnostic point information before sending the hardware agnostic point information to the system model;

receive hardware agnostic control commands from the system model and convert the received hardware agnostic control commands into hardware specific control commands before sending the hardware specific control commands to the appropriate devices installed at the building.

2. The BMS of claim 1, wherein the system model is stored on a cloud server, and the gateway is installed at the building, wherein the gateway is configured to communicate with the cloud server over a network connection.

3. The BMS of claim 1, wherein the BMS is part of a multi-site BMS that services multiple buildings, and wherein the system model defines a site hierarchy within the multi-site BMS.

4. The BMS of claim 1, wherein the system model further stores an installed location for at least some of the devices installed in the building.

5. The BMS of claim 1, wherein the system model further stores an alarm configuration for at least some of the devices installed in the building.

6. The BMS of claim 1, wherein the system model further stores a schedule configuration for at least some of the devices installed in the building.

7. The BMS of claim 1, wherein the system model is accessible and configurable by two or more different tools during different phases of setup of the BMS.

8. The BMS of claim 7, wherein the different phases of setup of the BMS include installation, engineering, commissioning, operation, and maintenance.

9. The BMS of claim 7, wherein each of the two or more different tools are configured to directly access and update the system model.

10. The BMS of claim 7, wherein each of the two or more different tools are configured to run on a mobile device.

11. The BMS of claim 1, wherein the gateway is configured to communicate with one or more of the devices installed at the building using one or more of BacNet, Modbus, LonWorks, DALI, KNX, EnOcean, Ethernet, Zigbee, Wifi, and Redlink.

12. A method for setting up a Building Management System (BMS) for controlling a plurality of devices installed at a building, the method comprising:

retrieving a system model configured to be used in controlling the plurality of devices installed in the building, the system model is configured to be developed and implemented in stages during different phases of use of the BMS including two or more of installation, engineering, commissioning, operation, and maintenance, wherein different tools are used by technicians to develop and implement the system model during each of two or more of the different phases, where the system model is configured to be directly accessed and updated by the different tools used by technicians when developing and implementing the system model during each of the two or more different phases including two or more of installation, engineering, commissioning, operation, and maintenance;

using one or more predefined templates of the system model to create the plurality of devices in the system model, wherein the predefined templates include user selectable elements and define one or more of data points, control parameters, schedule configuration, and alarm configuration for the corresponding devices, the predefined templates enforcing standardized device names and standardized point names that are hardware agnostic for use by the different tools when developing and implementing the system model, wherein once the system model is setup, the system model is configured to receive hardware agnostic point information and provide hardware agnostic control commands for controlling the plurality of devices; and linking the system model to a gateway at the building.

13. The method of claim 12, further comprising setting up the gateway to be coupled to one or more of the devices installed at the building.

14. The method of claim 13, further comprising setting up the gateway to:

receive point information from the one or more of the devices installed at the building and convert the received point information into hardware agnostic point information before sending the hardware agnostic point information to the model;

receive hardware agnostic control commands from the system model and converting the received hardware agnostic control commands into hardware specific control commands before sending the hardware specific control commands to the appropriate devices installed at the building.

15. The method of claim 12, wherein the system model is stored on a cloud server and the gateway communicates with the cloud server over a network.

16. The method of claim 12, wherein the one or more predefined templates are selected and configured using a mobile device that is operatively coupled to the system model.

17. A non-transitory computer readable medium storing instructions that when executed by a processor cause the processor to:

retrieve a system model for use in controlling a plurality of devices in a building, the system model is configured to be developed and implemented in stages during different phases including two or more of installation, engineering, commissioning, operation, and maintenance, wherein different tools are used by technicians to develop and implement the system model during each of two or more of the different phases, where the system model is configured to be directly accessed and updated by the different tools used by technicians when developing and implementing the system model during each of the two or more different phases including two or more of installation, engineering, commissioning, operation, and maintenance;

allow a user to use one or more predefined templates to create the plurality of devices in the system model, wherein the predefined templates include user selectable elements and define one or more of data points, control parameters, schedule configuration, and alarm configuration for the corresponding devices, the predefined templates enforcing standardized device names and standardized point names that are hardware agnostic for use by the different tools when developing and implementing the system model;

allow the user to link the system model to a gateway at the building; and once setup, the system model is configured to receive hardware agnostic point information from the gateway and provide hardware agnostic control commands to the gateway for controlling the plurality of devices.

18. The non-transitory computer readable medium of claim 17, wherein the system model further stores an installed location for at least some of the devices installed in the building.

19. The non-transitory computer readable medium of claim 17, wherein the system model defines an ontology of the plurality of devices installed at the building.

20. The non-transitory computer readable medium of claim 17, wherein the system model is accessible and configurable by one or more technicians during setup and operation of the system model.

\* \* \* \* \*